United States Patent [19]
Kobayashi

[11] Patent Number: 5,848,521
[45] Date of Patent: Dec. 15, 1998

[54] SCATTERED OBJECTS COLLECTOR

[75] Inventor: Fujio Kobayashi, Tokyo, Japan

[73] Assignee: Kioritz Corporation, Tokyo, Japan

[21] Appl. No.: 782,621

[22] Filed: Jan. 13, 1997

[30] Foreign Application Priority Data

Jan. 17, 1996 [JP] Japan ..................... 8-005373

[51] Int. Cl.⁶ .......... A01D 46/00; A01D 57/00; E01H 1/04
[52] U.S. Cl. .............. 56/13.2; 56/16.9; 56/202; 56/344; 56/400.11; 56/DIG. 8; 15/340.1; 15/346
[58] Field of Search ............ 56/344, 12.9, 13.1, 56/13.2, 13.5, 14.3, 16.9, 202, 400.11, 400.04, DIG. 8, DIG. 12; 15/340.4, 346, 83, 340.3

[56] References Cited

U.S. PATENT DOCUMENTS 4,924,664  5/1990  Hicks et al. ...................... 56/202
5,121,592  6/1992  Jertson ............................. 56/344
5,317,860  6/1994  Dunn ............................ 56/DIG. 8 X
5,390,387  2/1995  Dubé et al. .................... 56/400.11 X

FOREIGN PATENT DOCUMENTS 2652100  3/1991  France ........................... 15/340.4
6200507  6/1994  Japan .
2138280  10/1984  United Kingdom .......... 15/346

*Primary Examiner*—Terry Lee Melius
*Attorney, Agent, or Firm*—Baker & Botts, L.L.P.

[57] ABSTRACT

In a scattered objects collector, air which has inducted scattered object is extracted and treated to minimize the release of dust into the ambient. The scattered objects collector has a power source driving an induction fan, a scattered objects induction portion through which scattered objects are inducted by the fan, a scattered objects collection vessel, and an air discharge duct through which, for enhanced induction efficiency, extracted air is directed from the collection vessel back to the induction portion. A cutter can be installed at the induction fan.

2 Claims, 3 Drawing Sheets

SCATTERED OBJECTS COLLECTOR

BACKGROUND OF THE INVENTION

1. Field of the Invention

The present invention relates to a collector for scattered objects such as fallen leaves and mowed grass on the ground, and more particularly to a scattered objects collector with rotary raking brushes and an induction fan.

2. Description of the Related Art

Conventionally, scattered objects collectors have been developed for collecting scattered objects such as fallen leaves and mowed grass on the ground by which the scattered objects are raked into the collector by rotary raking brushes or the like, and the raked objects are collected in a vessel or the like. Alternatively, the scattered objects are inducted by an induction fan and are cut by cutter blades or the like which are attached to the induction fan, and the cut objects are transported to the collecting vessel or the like together with air extracted from the induction fan, for collection in the vessel. One such collector is disclosed in U.S. Pat. No. 5,240,189.

Without additional guide transportation means for guiding and transporting the scattered objects raked by the rotary brushes to the collecting vessel for storage, it is difficult for the conventional scattered object collector with rotary raking brushes to securely and efficiently collect a sufficiently large amount of such scattered objects in the collecting vessel. Further, without such means, scattered objects and the like lend to lodge between and become attached to the rotary brushes so that the scattered objects and the like disadvantageously rotate together with the rotary brushes.

Thus, in a scattered objects collector with an induction fan, after the scattered objects on the ground or the like are inducted through an induction air stream, the scattered objects are guided and transported by the stream for collection in the collecting vessel or the like. The induction air stream separated from the scattered objects in the collecting vessel or the like is extracted from the collector to the outside. As a result, if the induction air stream is extracted from the collector to the outside after passing through a filter or the like, it is inevitable that dust such as powdery dust is contained in the air stream and is scattered outside through the air stream, which has a harmful effect on the environment and the health of the operator of the scattered objects collector.

A scattered objects collector illustrated in FIG. 3 is disclosed in Japanese Patent Publication (Unexamined) No. Heisei 6-200507, including means for releasing air after induction of the scattered objects.

The scattered objects collector 50 comprises a scattered objects induction and collection section 51, a fan section 52, and a scattered objects collection section 53, in which pressure-transported air discharged from a fan 52a of the fan section 52 changes its direction of flow upward at the lower end 51a of the scattered objects induction and collection section 51 and is extracted from an air outlet opening 51b. Scattered objects on the ground or the like are guided to an inner passage 51c in the scattered objects induction and collection section 51 from the periphery of the air outlet opening 51b by the upward discharge of the pressure-transported air, and the scattered objects are transported to the scattered objects collection section 53 by way of the inner passage 51c. At the scattered objects collection section 53, the pressure-transported air and the scattered objects are separated from each other through a screen 53a such as a metal net, so that only the pressure-transported air is introduced into the suction side of the fan 52a and is induced by the fan 52a for return to the scattered objects induction and collection section 51 by pressure.

In the scattered objects collector 50, pressure-transported air separated from the scattered objects collected is inducted by the fan 52a, so that the environmental problem is solved there. However, in the induction of the scattered objects at the scattered objects induction and collection section 51, the direction of the pressure-transported air is changed for discharge from the air outlet opening 51b, which causes scattered objects to be inducted from the ground or the like. As a result, there is a large loss of energy of pressure-transported air. Further, if a cutter or the like for cutting the inducted scattered objects is installed, it is necessary to arrange the cutter at the scattered objects induction and collection section 51 or at the inner passage 51c between the scattered objects induction and collection section 51 and the scattered objects collection section 53, which causes the overall construction of the scattered objects collector 50 to become complicated, and there is a difficulty in that a driving device for the cutter should be mounted independently of a driving device for the fan 52a.

SUMMARY OF THE INVENTION

The present invention has been made to solve the problems described above, and an object thereof is to provide a scattered objects collector in which extracted air after the induction of scattered objects is efficiently treated to eliminate the release of dust in air, in which the induction efficiency of scattered objects is improved, and in which devices such as a cutter are easily installed.

A scattered objects collector according to the present invention comprises a power source, an induction fan driven by the power source, a scattered objects induction portion for inducing scattered objects through an induction force of the induction fan, a scattered objects collection vessel for collecting the scattered objects which are transported by air extracted from the induction fan, and an air discharge duct for introducing the extracted air from the induction fan, which is discharged to the scattered objects collection vessel, to the scattered objects induction portion. The scattered objects induction portion can be provided with a rake portion. The rake portion can be provided with many brushes. The air transportation duct can be provided with an air discharge spout for injecting the extracted air from the scattered objects collection vessel to the brushes.

The induction fan can be provided with a cutter for the scattered objects. The scattered objects collection vessel can be substantially a cylinder with a bottom. A scattered objects transportation duct for transporting the scattered objects from the induction fan can be secured to an outer periphery of an upper end portion of the scattered objects collection vessel so as to extend in a tangential direction of the outer periphery.

In the scattered objects collector according to the present invention, the induction fan is driven and rotated to generate a suction force of air at the scattered objects induction section, and scattered objects such as fallen leaves on the ground are raked by the rotary brushes at the rake portion to release the scattered objects inducted by the induction fan together with the inducted air on the scattered objects collection vessel side.

The scattered objects are cut by the cutter in the release process so as to be extracted from the induction fan, and the scattered objects are discharged in the scattered objects collection vessel as a swirl stream through the scattered objects transportation duct. The scattered objects drop in the swirl process. The extracted air is directed upwardly so as to be discharged to the air discharge duct.

The air discharged to the air discharge duct is injected to the brushes from the discharge spout of the scattered objects induction portion, and the scattered objects and the like lodged between the brushes are blown off for cleaning, and again are inducted together with the scattered objects by the induction fan.

DETAILED DESCRIPTION OF PREFERRED EMBODIMENTS

Figure 1:
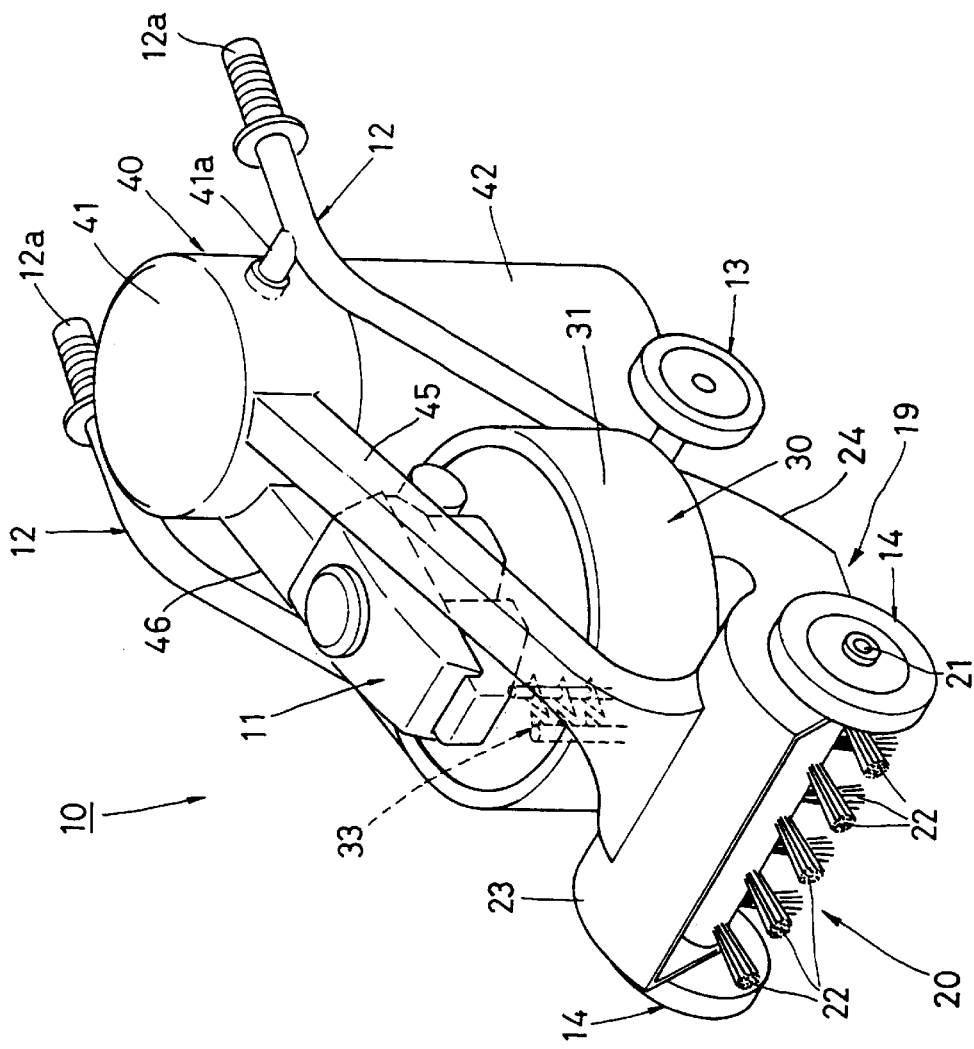
FIG. 1 is a schematic perspective view of a scattered objects collector according to an embodiment of the present invention.

The scattered objects collector 10 is provided with a power source 11 such as an internal combustion engine which is mounted of upper-center of the body thereof, a pair of right and left operation handle portions 12 which extend rearwardly, and a power driven propelling portion comprising a pair of right and left drive rear wheels 13 at lower-center of the body and a pair of right and left idle front wheels 14 at the front portion of the body, or the like. The scattered objects collector 10 further comprises a scattered objects induction portion 19 including a rake portion 20, mounted at the front portion of the body, an induction fan 30 mounted at the center of the body, and a scattered objects collection portion such as a scattered objects collection vessel 40 or the like mounted at the rear portion of the body.

Figure 2:
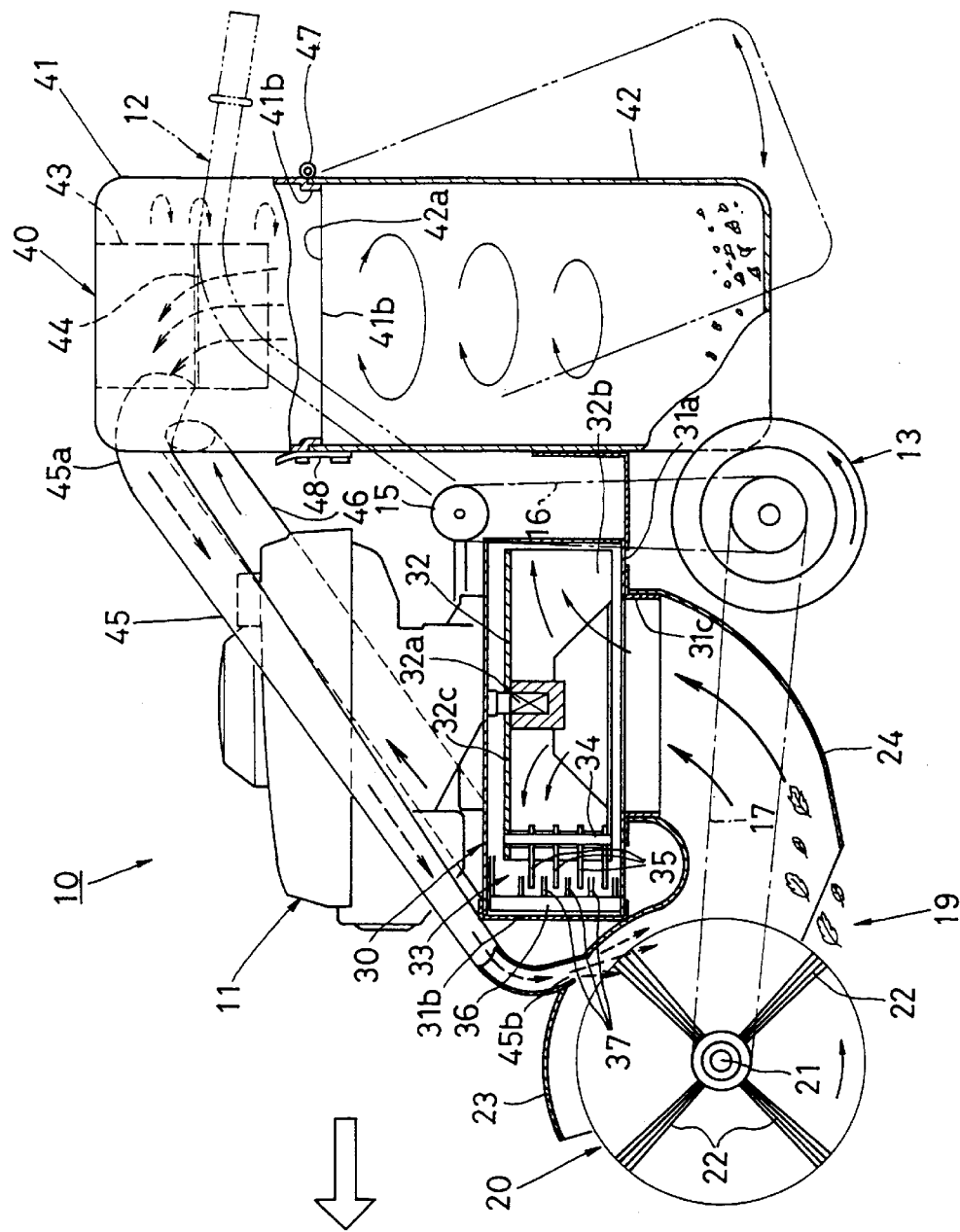
FIG. 2 is a fragmented side view of a primary portion of the scattered objects collector illustrated in FIG. 1.
Figure 3:
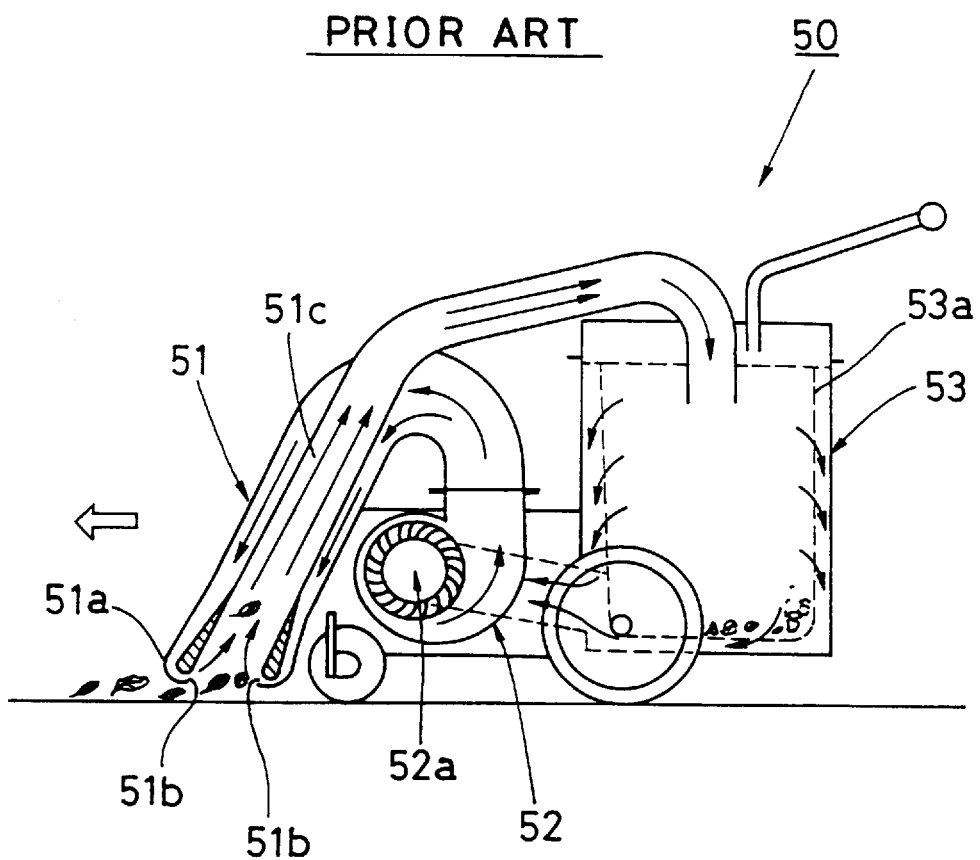
FIG. 3 is lateral cross-sectional view of a conventional scattered objects collector.

The scattered objects induction portion 19 including the rake portion 20 is driven by the internal combustion engine 11 and is provided with several brushes 22 radially on the brush drive shaft 21 which serves as an axle of the idle front wheels 14, and a guide cover 23 for covering the upper and side portions of the brushes 22. The brush drive shaft 21 rotates the brushes 22 counterclockwise in FIG. 2 where an arrow shows the direction of movement of the scattered objects collector 10 at work. The rotation of the brushes 22 causes scattered objects on the ground such as fallen leaves to be raked in and guided to the rear portion of the body by the guide cover 23 and a cylindrical lower transportation cover 24 integral with the guide cover 23.

The induction fan 30 is installed at the lower portion of the power source 11, and is provided with a fan casing 31 with a volute and a rotary wing portion 32 which is driven and rotated by the power source 11 positioned at the inner-central portion of the fan casing 31. The central portion of an end plate 31a of the fan casing 31 facing on the lower portion of the rotary wing portion 32 is open, and a suction spout 31c is formed there. To the suction spout 31c there is connected the upper end portion of a cylindrical lower transportation cover 24, and the raked-in scattered objects are guided in the fan casing 31 of the induction fan portion 30 through the suction spout 31c. On the peripheral side surface 31b of the fan casing 31 there is formed a discharge spout (not shown) from which compressed air from the induction fan 30 and scattered objects are discharged. To the discharge spout there is connected the lower end of the scattered objects transportation duct 46. The upper end of the scattered objects transportation duct 46 is connected to the upper portion of the scattered objects collection vessel 40.

The rotary wing portion 32 is provided with a drive shaft 32a (an output shaft of the internal combustion engine 11), three to four wing plates 32b, and an upper rotary end plate 32c. These elements are formed integrally with each other. The rotation of the rotary wing portion 32 permits air and the scattered objects to be sucked from the suction spout 31c, and the sucked air and the scattered objects are outwardly and radially released. The sucked air and the released scattered objects reach the inner periphery of the peripheral side surface 31b of the fan casing 31 and are transported in the upper end portion of the scattered objects collection vessel 40 from the discharge spout through the scattered objects transportation duct 46.

In the induction fan 30 there is installed a cutter 33 for cutting the sucked scattered objects, integral with the induction fan 30. That is, in the middle of the periphery of radially outer end portions of the wing plates 32b there is oscillatably supported a movable cutter support shaft 34. To the movable cutter support shaft 34 there are affixed suitable pieces of movable cutters 35 at regular vertical intervals. On the inner peripheral side of the fan casing 31 and in the vicinity of the discharge spout, a fixed cutter support shaft 36 is secured, and further fixed cutters 37 are disposed and secured on the fixed cutter support shaft 36 at regular vertical intervals, overlapping with the movable cutters 35 between them.

The cutter 33 consists of a movable section with the movable cutter support shaft 34 and the movable cutter blades 35, and a fixed section with the fixed cutter support shaft 36 and the fixed cutters 37. The movable cutters 35 rotate about the drive shaft 32a by the rotation of the rotary wing portion 32, and the movable cutters 35 can oscillate about the axis of the movable cutter support shaft 34. When rotating, each of the movable cutters 35 passes between the fixed cutters 37 which are positioned like a comb, so that the passing of the movable cutters 35 between the fixed cutters 37 causes the scattered objects to be cut by the fixed cutters 37 and the movable cutters 35.

The scattered objects collecting vessel 40 is a substantially vertically extending cylinder and comprises a cylindrical chamber 41 which is situated at the upper portion thereof for sucking air containing scattered objects and delivering air only, and a collection section 42 which is disposed at the lower portion of the scattered objects collecting vessel 40 for collecting the scattered objects. The cylindrical chamber 41 is supported on the handles 12 through a pair of right and left fixed pipes 41a which face each other, and in the cylindrical chamber 41 a cylindrical guide 43 with an open lower portion extends downwardly. In the cylindrical guide 43 there is disposed a dust collection screen 44 such as a metal net. The upper end of the scattered objects transportation duct 46 is connected to the upper peripheral portion of the cylindrical chamber 41 such that the upper portion of the scattered objects transportation duct 46 directs in a tangential direction of the upper inner portion of the cylindrical chamber 41, and the mixture of the scattered objects and the transporting air which is introduced in the cylindrical chamber 41 through the scattered objects transportation duct 46 generates a swirl in the scattered objects collection vessel 40 about the cylindrical guide 43, providing a cyclone effect to separate the scattered objects from the transporting air.

To the upper end of the outer periphery of the cylindrical chamber 41 there is secured an upper end 45a of the air transportation duct 45 so as to communicate with the inside of the cylindrical guide 43, and only air which is separated from the mixture in the scattered objects collection vessel 40 through the dust collection screen 44 is introduced to the rake portion 20.

The collection section 42 has the shape of a cylinder with a bottom and is integrally made of synthetic resin. The collection section 42 is openably/closably and detachably supported and secured to a lower opening portion 41b of the cylindrical chamber 41 through a hinge 47 and a latching element 48 which are mounted at the upper opening portion 42a while preventing air leakage.

The lower end of the air transportation duct 45 is connected and secured to the guide cover 23 of the raking portion 20 to form an air discharge spout 45b, and air discharged from the scattered objects collection vessel 40 is injected to radial tip portions of the brushes 22 to blow off and clear scattered objects including those lodged between the brushes 22. The direction in which the discharge air is injected from the air discharge spout 45b of the air transportation duct 45 is opposite to the direction in which the brushes 22 rotate, that is, the discharged air deflects the air that is inducted by the induction fan 30. As a result, the brushes 22 are efficiently cleaned, and the discharged air immediately is induced again by the induction fan 30, thus preventing the air from being discharged from the raking portion 20 to the outside.

Power generated by the power source 11 is transmitted to the drive shaft 32a of the induction fan 30 to rotate the rotary wing portion 32 and to drive and rotate the pair of the rear wheels 13 through a power transmitter, a clutch (not shown), a transmission sprocket 15, a transmission chain 16 or the like which are disposed at the rear portion of the power source 11, and further to rotate the brush driving shaft 21 through a driving chain 17.

After starting the power source 11, operation levers (not shown) which are attached to grip portions 12a of the handle portions 12 are operated to transmit the power from the power source 11 to the rear wheels 13 to rotate them, and to rotate the brushes 22 of the raking portion 20, causing the scattered objects collector 10 to travel. When the rotation of the induction fan 30 causes the rake portion 20 (scattered objects induction portion 19) to generate an air suction force, scattered objects such as fallen leaves on the ground are rearwardly raked by the rotating brushes 22 of the raking portion 20. The raked scattered objects enter the inside of the rotary wing portion 32 from the suction spout 31c of the induction fan 30 and from the lower-central portion of the rotary wing portion 32 by the air suction force through the cylindrical lower transportation cover 24, and the scattered objects are released radially outward together with the suction air through centrifugal force of the rotary wing portion 32.

The scattered objects which are radially released to the peripheral side surface 31b of the fan casing 31 of the induction fan 30 are cut into pieces by the cutter 33, and are released as a mixture of the scattered objects and the air from the induction fan 30. Then, the scattered objects are released as a swirl at the upper portion in the scattered objects collection vessel 40 through the scattered objects transportation duct 46. In the mixture of the scattered objects and the air, the scattered objects drop in the process of swirling in the scattered objects collection vessel 40, and the air is upwardly guided in accordance with the increase of pressure in the scattered objects collection vessel 40 so as to enter the inside of the cylindrical guide 43, and the air further passes through the dust collection screen 44 for cleaning and for discharge to the air transportation duct 45.

The air discharged to the air transportation duct 45 is injected to the brushes 22 from the guide cover 23 of the rake portion 20 to blow off the scattered objects or the like which are lodged between the brushes 22 for cleaning. The air injected is inducted again by the induction fan 30.

The invention is not limited to the above-mentioned embodiment, and the design of the scattered objects collector can be changed without departing from the concept of the claimed invention. This applies e.g., to rake portion, the suction fan, the cutter, the collection vessel or the like. Further, the wheels need not be driven by an internal combustion engine, and the scattered objects collector can be moved manually by an operator.

In a scattered objects collector according to the present invention, air from the scattered objects collector is introduced to the rake portion, where the scattered objects are inducted, so that air containing particle dust is not released, thus preventing environmental pollution and allowing healthy working conditions for workers.

Upon releasing air to the rake portion, the air is injected to the rotating brushes, and scattered objects or the like which are lodged between the brushes can be blown off to clear those portions.

The air from the scattered objects collection vessel is not released to the outside of the body, so that a screen can be used with coarser mesh than that of a conventional collector, minimizing clogging of the screen in the present invention. As a result, the screen does not have to be cleaned as often, permit long term continuous operation of the scattered objects collector.

What is claimed is:

1. A scattered objects collector comprising:

a power source;

and induction fan drive-coupled to the power source for generating an air intake stream;

a scattered objects induction portion disposed and configured for inducting scattered objects in the air intake stream and comprising a rake portion with a plurality of brushes;

a scattered objects collection vessel connected to the induction portion for collecting the collected inducted objects out of the air intake stream, thereby leaving a residual air stream; and an air discharge duct configured and disposed for discharging the residual air stream to the scattered objects induction portion and comprising an air spout which is configured and disposed for discharging the residual air to the brushes.

2. The collector according to claim 1, wherein:

the induction fan comprises a cutter for the scattered objects in the air intake stream;

the collection vessel is substantially cylindrical and has a bottom and an upper end portion having an outer periphery; and the connection between the induction portion and the collection vessel comprises a scattered object transportation duct from the induction fan to the collection vessel, with the scattered object transportation duct being tangentially connected to the inner periphery of the upper end portion of the collection vessel.

* * * * *